(12) United States Patent
Bäumer

(10) Patent No.: US 7,694,625 B2
(45) Date of Patent: Apr. 13, 2010

(54) APPARATUS FOR REMOVING MOLTEN MASS FROM CONFECTIONARIES

(75) Inventor: Volker Bäumer, Bad Salzuflen (DE)

(73) Assignee: Sollich KG (DE)

( * ) Notice: Subject to any disclaimer, the term of this patent is extended or adjusted under 35 U.S.C. 154(b) by 451 days.

(21) Appl. No.: 11/642,085

(22) Filed: Dec. 20, 2006

(65) Prior Publication Data
US 2007/0163491 A1    Jul. 19, 2007

(30) Foreign Application Priority Data
Dec. 29, 2005   (DE)   ......... 10 2005 062 893

(51) Int. Cl.
*A23L 1/00* (2006.01)
(52) U.S. Cl. .................. 99/386; 99/443 C
(58) Field of Classification Search ........ 99/352–355, 99/339, 340, 386, 443 C, 443 R, 450.1, 450.2, 99/483, 516, 404, 485
See application file for complete search history.

(56) References Cited

U.S. PATENT DOCUMENTS 3,323,922 A * 6/1967 Durst .................... 426/89
3,431,112 A * 3/1969 Durst .................... 426/89
3,682,659 A * 8/1972 Jurczak et al. ........... 426/329
4,416,906 A * 11/1983 Watkins ................. 426/107
4,553,010 A * 11/1985 Bohrer et al. ........... 219/727

FOREIGN PATENT DOCUMENTS

| DE | 440-677 | 5/1926 |
|---|---|---|
| DE | 440677 | 5/1926 |
| DE | 527751 | 6/1931 |
| DE | 43-22-414 C1 | 8/1994 |
| DE | 4322414 C1 | 8/1994 |
| EP | 0 632 962 B1 | 1/1995 |
| EP | 0632962 B1 | 1/1995 |

* cited by examiner

*Primary Examiner*—Timothy F. Simone
(74) *Attorney, Agent, or Firm*—Thomas, Kayden, Horstemeyer & Risley, LLP

(57) ABSTRACT

An apparatus for removing molten mass, especially chocolate mass, from a rear bottom portion of items, especially confectionaries, includes a first and a second conveyor belt for transporting the items in a conveying direction perpendicular to the working width of the apparatus. The second conveyor belt is located adjacent to the fist conveyor belt and downstream of the first conveyor belt as seen in the conveying direction. A driven hollow shaft is located in a gap portion between the two conveyor belts, it extends over the working width, and it is supported from its inside and within the working width.

28 Claims, 2 Drawing Sheets

APPARATUS FOR REMOVING MOLTEN MASS FROM CONFECTIONARIES

CROSS REFERENCE TO RELATED APPLICATIONS

This application claims priority to co-pending German Patent Application No. DE 10 2005 062 893.1 entitled "Vorrichtung zum Entfernen von Masse im Bodenbereich von Warenstücken", filed Dec. 29, 2005.

FIELD OF THE INVENTION

The present invention generally relates to an apparatus for removing molten mass, especially chocolate mass, from the rear bottom portion of items, especially confectionaries.

More particularly, the present invention relates to an apparatus including two adjacent conveyor belts, one being located downstream of the other one as seen in a conveying direction. A gap portion is located between the two conveyor belts in the conveying direction. The apparatus further includes a driven shaft being located in the region of the gap portion.

When confectionary items such as serial bars, cookies, candy and the like, for example, are to be coated with a mass, the molten coating mass is supplied by and in a coating machine. The coating mass may be supplied to the items only from above or also by using a so called "bottom wall" and the like to also supply coating mass to the bottom part of the items. The conveyor belt being located in the region of the coating machine is designed as a grating belt to allow for the majority of the mass (which is used with a surplus) to run off and to flow through the grating belt to be further conveyed within the respective circuit of the coating machine. Another conveyor belt is located at the end at the exit side of the first conveyor belt of the coating machine. Preferably, the second conveyor belt is part of a cooling channel which serves to transform the coating mass being located on the items completely into the solid state and to cool it.

BACKGROUND OF THE INVENTION

An apparatus for removing molten mass from the rear bottom portion of items is known from German Patent No. DE 440 677. The known apparatus includes two adjacent conveyor belts with a gap portion being located therebetween. The apparatus includes a solid shaft having a small outer diameter which serves to remove a part of the molten mass from the gap portion between the two adjacent conveyor belts. The shaft is located in the gap portion and at a small distance below the conveying path. The conveying path is formed by the surfaces of the two adjacent conveyor belts. The shaft is supported by bearings being located outside of the working width of the conveyor belts. The shaft is driven to rotate at a number of revolutions in a range of approximately 1,000 revolutions per minute. The mass tends to form edges or tails by flowing down from the rear portion of the items when the items are located in the gap portion between the two conveyor belts. When the mass flows a little further down than the conveyor plane in the gap region due to gravity, this part of the coating mass contacts the surface of the solid shaft, and it is removed thereby. In other words, the molten and kneadable mass is torn away, the torn away part of the mass being wound up and being removed, respectively, by the solid shaft.

The known apparatus attains a good effect when being used in combination with comparatively big and long, respectively, items such as bars or cookies. Due to the fact that the length of the items in the conveying direction has to be chosen not to be too small due to the gap between two adjacent conveyor belts, there is the possibility of choosing the diameter of the solid shaft to be comparatively great. This leads to the solid shaft having sufficient stability even when driving it at comparatively great numbers of rotations. This especially applies to small working widths, meaning working widths below 600 mm. When using greater working widths and especially when conveying items which are comparatively short as seen in the conveying direction, as for example brandy beans or brandy cherries, the width of the gap between two adjacent conveyor belts has to be chosen to be very small to allow for the short items to pass the gap portion as desired. In case the working width of the apparatus is additionally chosen to be great, for example in a range of between 1,000 and 2,000 mm, the known apparatus causes problems. There are vibrations occurring at the shaft which necessarily has a small diameter and which is comparatively long. The shaft tends to flutter and to lift off such that it does no longer fulfill its function. This danger especially applies to the middle portion of a long shaft. The desired effect of removing the edges in the rear bottom portion of the items is no longer attained in the middle portion.

The shaft may be supported on a heated stripper sheet metal which is arranged to be stationary and to be approximately vertical. The stripper sheet metal is arranged at an angle with respect to the shaft such that the removed mass is transferred from the shaft to the stripper sheet metal. Due to heating of the stripper sheet metal and the generation of heat caused thereby which act upon the shaft, the removed mass remains in the molten state such that it may flow down due to gravity to be reintroduced into the circuit of the coating machine. The surface of the shaft is continuously cleaned from mass by the stripper sheet metal.

To prevent fluttering, lifting off and displacement effects of the shaft with respect to the stripper sheet metal, it is known to arrange bearing lugs, clamps, wire loops and the like in a spaced apart manner such that they at least partly encompass the shaft and which function as additional stationary bearings for the shaft within the working width. In addition to these additional bearings, the shaft with its ends is additionally supported in two end bearings being located outside of the working width of the conveyor belts. The bearing lugs, clamps and the like have the negative effect that either the distance between the two conveyor belts in the gap portion is enlarged or the diameter of the shaft has to be reduced in a respective way. In case the bearing lugs, clamps and the like also surround the shaft at its upper surface, meaning the surface facing the conveying path, it is only possible to a limited extent to arrange the shaft comparatively close to the upper surface of the conveying path and to the end and to the beginning of the two conveyor belts. As a result, the distance in a vertical direction and in a horizontal direction is comparatively great which leads to the effect of comparatively short edges or tails of molten mass no longer being contacted and removed by the shaft. The major disadvantage of such bearing lugs, clamps and the like however is that it is possible that mass builds up on them, the mass smearing and negatively influencing the bottom of such goods which pass the place where the bearing lugs are arranged as they are conveyed on the conveyor belts. In case the coating machine is only designed for one certain product and the items are transported in predetermined rows, there is the possibility or arranging the bearing lugs between the rows of items. However, when processing various products in the coating machine, this is not possible. In addition, one always needs to reckon that even predetermined rows of items may change their position in a lateral direction such that the items nevertheless contact the bearing lugs. In the region in which the bearing lugs act upon the shaft, the shaft loses its removing function, or this function is at least negatively influenced to a great extent. Furthermore, it is disadvantageous that the bearing lugs, clamps and the like which may be supported and arranged on the stripper sheet metal in a stationary way have to be designed to be very thin due to the above described conditions. They are elements which are immediately subjected to wear and tear and which need to be replaced rather often. Especially when the bearing lugs are designed to be closed, replacement of the shaft and/or of the bearing lugs requires substantial disassembly and assembly work during which the coating machine cannot be used for production. Especially, shafts which are driven to rotate at a great number of rotations may be deformed to become eccentric during normal operation and especially when foreign matter reaches the region between the shaft and the stripper sheet metal. Such eccentricity deforms the shaft in a way that it can no longer be used and that it needs to be replaced. Only in rare cases it is possible to straighten such an eccentric shaft outside of the coating machine such that the shaft can be further used. Usually, the shafts need to be replaced by new shafts. The replacement takes a substantial amount of time during which at least the two bearings located at the ends and outside of the working width need to be disassembled to get access to the shaft.

An apparatus for removing molten mass, especially chocolate mass, from the rear bottom portion of items is known from German Patent No. DE 43 22 414 C1 corresponding to European Patent No. EP 0 632 962 B1. A driven solid shaft extending over the working width of the apparatus is arranged in the gap portion between two adjacent conveyor belts. A heated stripper sheet metal is arranged below the shaft in a stationary way and at an approximately vertical orientation. The shaft is supported on the stripper sheet metal, and it is cleaned from surplus mass by the stripper sheet metal. The shaft is kept in place and supported on the stripper sheet metal due to magnetic forces. In this way, one not only attains a supporting function of the shaft on the stripper sheet metal, but one also realizes a more or less continuous support for the shaft on the stripper sheet metal, the support extending over the working width. Due to magnetic attraction between the shaft and the stripper sheet metal, it is furthermore ensured that the shaft is located at a certain angle with respect to the stripper sheet metal and that the stripper sheet metal can fulfill its stripping and cleaning effect for the shaft during rotation of the shaft about its axis. The magnetic forces may however also act upon the region where the two conveyor belts are deflected in a way to cause attraction and repulsion effects between the shaft and the conveyor belts which may lead to a negative displacement of the shaft. To prevent this, the distance may not fall below a certain minimum value. The outer diameter of the shaft cannot be chosen as small as this would be desired for small items.

SUMMARY OF THE INVENTION

The present invention relates to an apparatus for removing molten mass from a rear bottom portion of items. The apparatus includes a conveyor belt having a working width. The items rest on the conveyor belt within the working width. The conveyor belt is designed and arranged to transport the items in a conveying direction perpendicular to the working width. A shaft is designed and arranged to be driven to rotate in a way to contact and remove the mass from the rear bottom portion of the items. The shaft is designed as a hollow shaft. The shaft is designed and arranged to extend over the working width and to be supported from inside and within the working width. For example, the apparatus may be a coating machine for coating confectioneries with chocolate mass.

The present invention also relates to an apparatus for removing molten mass from a rear bottom portion of items, the apparatus including a first conveyor belt, the first conveyor belt having a working width, the items resting on the first conveyor belt within the working width, the first conveyor belt being designed and arranged to transport the items in a conveying direction perpendicular to the working width. The apparatus further includes a second conveyor belt, the second conveyor belt having a working width, the items resting on the second conveyor belt within the working width, the second conveyor belt being designed and arranged to transport the items in a conveying direction perpendicular to the working width, the second conveyor belt being located adjacent to the fist conveyor belt and downstream of the first conveyor belt as seen in the conveying direction. The apparatus further includes a shaft, the shaft being designed and arranged to be driven to rotate, the shaft being designed as a hollow shaft, the shaft being designed and arranged to extend over the working widths of the first and second conveyor belts and the shaft being designed and arranged to be supported from inside and within the working widths of the first and second conveyor belts. The shaft may be arranged in a gap portion located between the first and second conveyor belt.

A part of the mass being located on the items still is in the molten state and in the kneadable state, respectively, when the coated items reach the region where they are transferred from the first conveyor belt onto the second conveyor belt being located downstream of the first conveyor belt. Due to the fact that there always is a gap between two adjacent conveyor belts, the mass forms edges or tails in the rear bottom portion of the items, meaning in a direction opposite to the conveying direction of the items, especially in the gap portion. These edges or tails form a frayed rim of the items such that the bottom rim of the coated items does not have an even continuous shape in that region. The rear frayed rim including the edges and tails does not only have a negative influence on the appearance, but it also negatively influences further processing of the items. There is the danger of a part of these edges breaking off when the items are located on one or more following conveyor belts. This leads to soiling of the conveyor belts during long operational times of the apparatus. However, such edges may also have negative effects in packing machines being located downstream.

The novel apparatus overcomes these drawbacks and operates in a reliable way even when processing short items and when using small gaps between the conveyor belts and a great working width, especially between 1,000 mm and 2,000 mm.

The novel apparatus includes a hollow shaft or a tube having an annular cross-section. Such a tube does not only have increased stability compared to a solid shaft. The hollow shaft also is less susceptible to fluttering, buckling and tensions building up. Due to the use of a hollow shaft and of a tube, respectively, there is the possibility to use the free cross-section of the hollow shaft to arrange a support which contacts the shaft from the inside without consuming much room. At the same time, there is the substantial advantage of the shaft being supported from the inside over the working width of the apparatus. In this way, elements protruding in an outward direction from the working width are omitted such that the surface of the tube can be moved very close to the deflecting locations of the two conveyor belts. This does not mean that known additional bearings may not be arranged outside of the working width, these bearings accommodating the hollow shaft. However, within the working width the dimensions of the hollow shaft and of the supporting element are coordinated in a way that the shaft may have a very small outer diameter which may be in a range of approximately 3 mm or even less. In this way, it is possible to arrange the ends of the first conveyor belt and the beginning of the following second conveyor belt very close to one another such that novel apparatus is especially suitable for processing small items, for example baby-sized filled chocolates. Important advantages of the hollow shaft being supported from the inside are certain recovery properties and a certain tendency to restore, respectively. It is still possible that a small crumb of a cookie, a splitter of a nut and the like which are broken off from the item reach the gap between the shaft and the stripper sheet metal which leads to the shaft partly leaving its predetermined location with respect to the stripper sheet metal. When supporting the shaft with magnetic forces as it is known in the prior art, these forces are reduced when the shaft leaves its predetermined position. The novel hollow shaft being supported from the inside results in these forces being increased when the shaft leaves its predetermined position. In other words, the hollow shaft is automatically returned to its predetermined location.

A supporting element may be arranged in the free cross-section of the driven hollow shaft, the supporting element at least extending over the working width of the free cross-section. Usually, the supporting element will also extend outside of the working width of the apparatus and through supports and bearings being located at that place and to extend through the motor. It is also possible to arrange a plurality of supporting elements in the free cross-section of the hollow shaft, the supporting elements being interconnected. This applies to the axial direction and/or to the radial direction. Usually, it is sufficient if the supporting element is arranged to be stationary, wherein a clearance required for the rotational movement of the hollow shaft with respect to the stationary supporting element is located between the supporting element and the hollow shaft. It is possible to take further measures for reducing friction between the supporting element and the hollow shaft.

It makes sense if the supporting element is kept under tensile stress. Depending on the details of the design of the supporting element, the tensile stress serves to tighten the supporting element and to keep the supporting element in the stretched position to enable the supporting element to fulfill its guiding function for the rotating hollow shaft. For example, the guiding element may be a bearing rod, a wire or a wire cable made of metal and/or of plastic. It is also possible to use supporting elements including a core upon which a different material is wound up. In this case, there is the possibility of the core especially serving to accommodate the tensile stress, while the wound up portion provides for preferably low friction between the supporting element and the inner circumference of the hollow shaft.

The hollow shaft and the supporting element may be used with or without a heated stripper sheet metal. Usually, such a heated stripper sheet metal will be used to additionally support and guide the hollow shaft, on the one hand. On the other hand, the stripper sheet metal supplies the cleaning effect by removing the mass from the hollow shaft.

The hollow shaft and the associated supporting element may be arranged to be height adjustable. It is also possible to provide a possibility of an adjustment in the conveying plane to be capable of adjusting the respective distances with respect to the kind of the items in an optimal way.

The supporting element may also be designed to be resilient to a limited extent, for example similar to a wire cable or a wire strand. However, it is also possible to use stiff bodies in an elongated shape as the supporting element. These bodies may have a rectangular, square, polygonal or circular cross-section, for example.

A tensioning apparatus may be arranged to supply the tensile stress to the supporting element, the tensioning apparatus allowing for sensitive adjustment of the tensile stress. A spring may be arranged in addition or as an alternative.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
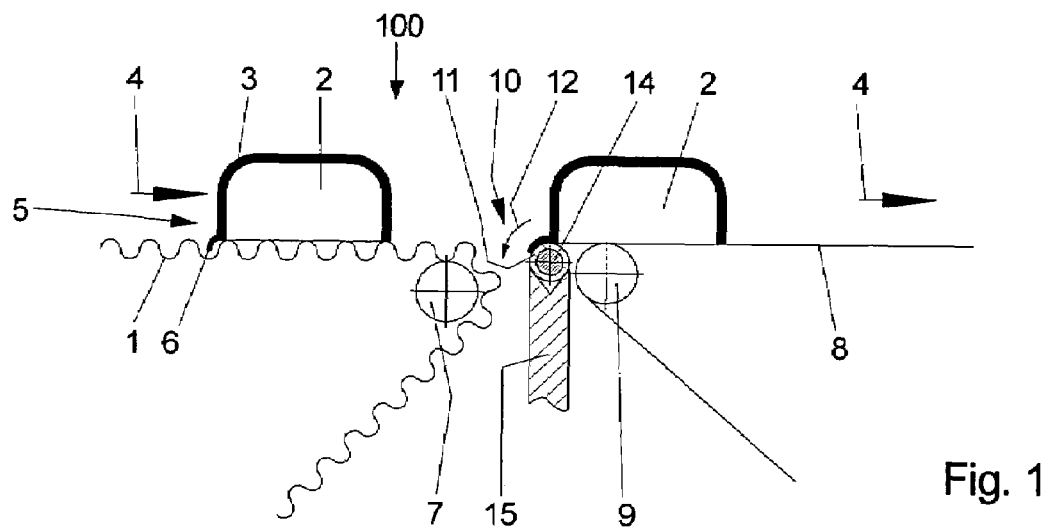
FIG. 1 is a vertical sectional view through a novel apparatus including two adjacent conveyor belts being located one after the other as seen in the conveying direction, meaning a direction transverse to the working width.

Referring now in greater detail to the drawings, FIG. 1 illustrates a first exemplary embodiment of a novel apparatus 100. The transition location between two adjacent conveyor belts is to be seen in FIG. 1. Items 2 are transported on a conveyor belt 1 which usually is designed as a grating belt. The grating belt is illustrated in an exaggerated way in FIG. 1. The items 2 are covered by a mass 3, or they are decorated with such a mass 3, and they are conveyed in the direction of arrow 4. Arrow 4 also indicates the direction of rotation of the conveyor belt 1. The item 2 illustrated in the left part of FIG. 1 which is transported on the conveyor belt 1 includes an edge 6 which more or less protrudes into the surface of the grating belt 1. Similar edges or ridges may be arranged about the circumference of the item 2, meaning in the front bottom portion and/or a lateral portion. Usually, these edges cause fewer problems than the edges located in the rear bottom portion 5. The conveyor belt 1 at its one end is deflected by means of a deflecting roller 7. Another conveyor belt 8 is located downstream of the conveyor belt 1 and close to the end of the conveyor belt 1. The conveyor belt 8 is driven to rotate in the same conveying direction according to arrow 4. A deflecting roller 9 is located at the beginning of the conveyor belt 8. In this way, there is a gap region 10 between the conveyor belts 1 and 8, the items 2 having to be transported over and beyond the gap portion 10. The gap portion 10 is used in a known way to remove molten mass from the rear bottom portion 5 of the items 2 to prevent edges 6, tails and similar elements from occurring. Such elements do not only cause a negative appearance, but they may also disturb further processing of the items 2. The apparatus 100 includes a hollow shaft 11 which is driven to be rotated. The hollow shaft 11 is located in the gap portion 10. The hollow shaft 11 serves to remove surplus molten mass 3, especially from the rear bottom portion 5 of the items 2. The drive of the shaft 11 may be operated for an opposite sense of rotation according to arrow 12 or for a rotation in the same sense of rotation. The drive is realized by a motor 13 (see FIG. 2). The hollow shaft 11 at its inside, meaning in its free cross-section, is supported by a supporting element 14. In this way, the free cross-section of the hollow shaft 11 is used for the support without having to increase the outer diameter of the hollow shaft 11 due to the support. Preferably, only the clearance required for the relative position is arranged between the supporting element 14 and the inner circumference of the hollow shaft 11. The hollow shaft 11 may be driven with comparatively great numbers of rotation, for example between approximately 2,000 to 3,000 rotations per minute. The supporting element 14 may be arranged in a stationary way.

The surface of the conveyor belt 8 is located in a conveyor plane which is located adjacent to the conveyor plane of the conveyor belt 1. The items 2 are supported in the conveyor plane. The hollow shaft 11 with its supporting element 14 may be designed and arranged such that its height can be adjusted with respect to the common conveyor plane. The width of the gap portion 10 may also be chosen to be adjustable. In this way, the distance between the two deflecting rollers 7 and 9 may be adjusted with respect to the outer diameter of the hollow shaft 11 in response to the respective kind and size of the items 2.

In a first exemplary embodiment, the hollow shaft 11 and the supporting or bearing element 14 may be arranged in the gap portion 10 in a freely suspended way. Surplus mass 3 in the form of edges 6 is contacted by the surface of the rotating hollow shaft 11, and it is thus torn away in the rear bottom portion 5 such that one attains a uniform smooth rear edge of the items 2 as it makes sense and is required for further processing.

Figure 2:
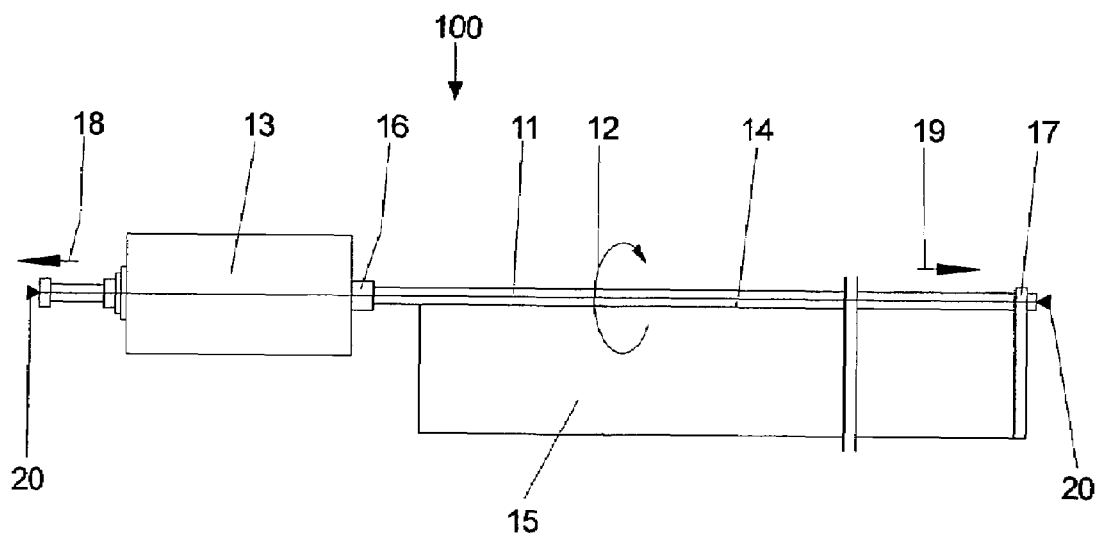
FIG. 2 is a schematic top view of the apparatus of FIG. 1 illustrating some elements of the apparatus in greater detail.

However, it is also possible to additionally support the unit including the hollow shaft 11 and the supporting element 14 on a stripper element 15. FIG. 2 illustrates the stripper element 15, and it shows the width of the stripper element 15 which approximately corresponds to the working width of the apparatus 100. In the region of the working width, the hollow shaft 11 is only supported by the supporting element 14 which contacts the hollow shaft 11 from the inside and which extends at least over the working width, meaning approximately about the width of the stripper element 15. Furthermore, the hollow shaft 11 may be supported outside of the working width by additional supports 16 and 17 which encompass and accommodate the hollow shaft 11 from the outside. The supporting element 14 may be designed not only to extend over the working width, but furthermore over the entire extension of the apparatus 100 (see FIG. 2), meaning to protrude through the motor 13. The supporting element 14 preferably is kept under tensile stress. The tensile stress is indicated by arrows 18 and 19. The tensile stress may be applied by means of an adjustment unit 20. It is also possible to arrange a spring (not illustrated) at this place.

Figure 3:
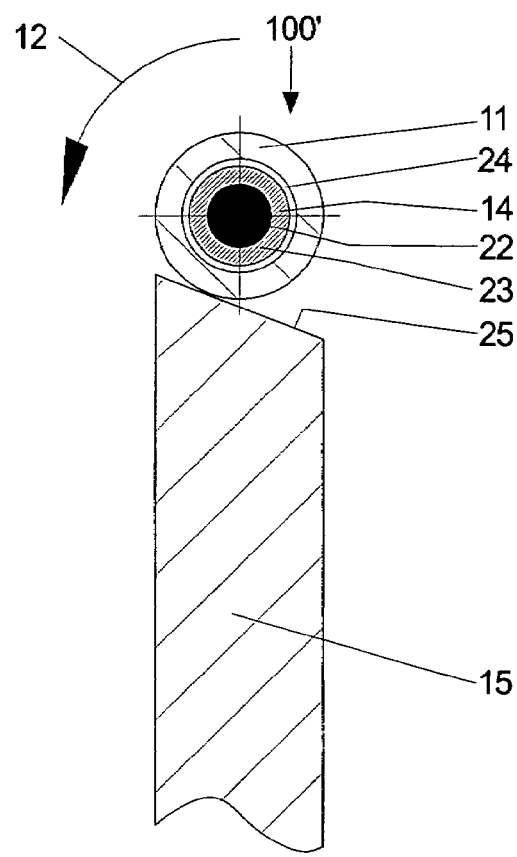
FIG. 3 is an enlarged view of some elements of the apparatus.
Figure 4:
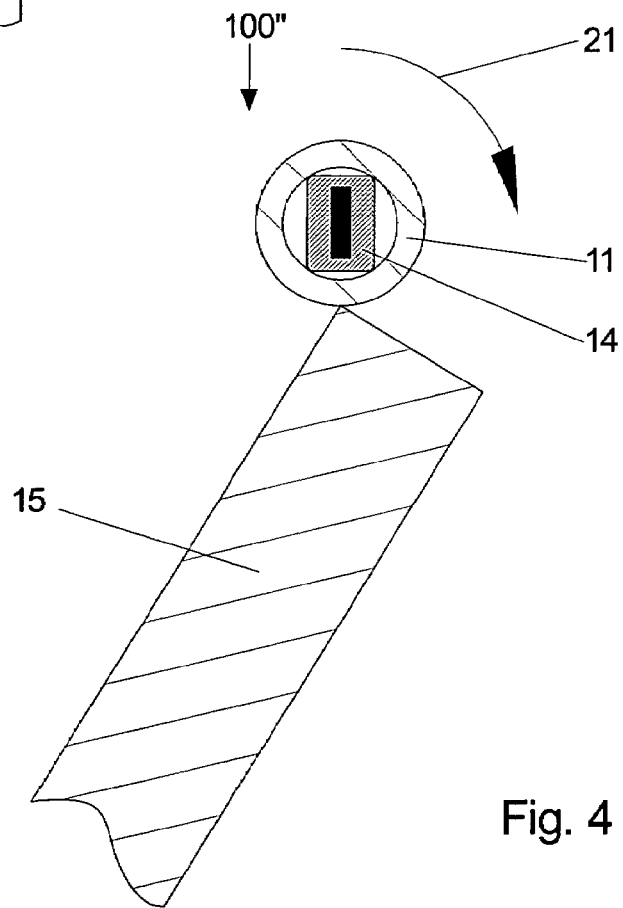
FIG. 4 is a similar view as FIG. 3 illustrating a second exemplary embodiment of the novel apparatus.

FIGS. 3 and 4 illustrate additional exemplary embodiments of the novel apparatus 100' and 100". The apparatus 100' and 100", respectively, includes the hollow shaft 11 and the supporting element 14 which have a different design and which are illustrated in a relative position with respect to the stripper element 15. The stripper element or sheet 15 may be arranged to be substantially vertical, it may have a V-shape (see FIG. 1), or it may be designed and arranged in a different way and at a different position with respect to the hollow shaft 11. The hollow shaft 11 is driven to either rotate in the opposite direction according to arrow 12 or in the same direction according to arrow 21. In the latter case, the hollow shaft 11 may also be used to fulfill a conveying function.

In the exemplary embodiment of the novel apparatus 100' according to FIG. 3, a supporting element 14 is arranged in the interior of the hollow shaft 11 which includes a core 22 and a wrapping 23. The wrapping 23 is sized such that there only is sufficient clearance 24 with respect to the inner surface of the hollow shaft 11 as it is required for the rotational movement. The stripper element 15 at its side facing the hollow shaft 11 includes an inclined supporting surface 25.

The exemplary embodiment of the novel apparatus 100" according to FIG. 4 includes a supporting element 14 which approximately has a rectangular cross-section and rounded corners. It is also possible to use a polygonal cross-section. Once again, the design and arrangement is chosen such that one attains the clearance 24 as described above. This embodiment of the novel apparatus 100" has the advantage of the friction occurring between the supporting element 14 and the hollow shaft 11 being extremely low.

The relative arrangement of the hollow shaft 11 and of the stripper element 15 are to be seen in FIG. 4. The elements have been positioned in a way that one corner of the stripper element 15 supplies the desired continuous cleaning effect to the surface of the hollow shaft 11.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for removing molten mass from a rear bottom portion of items, comprising:
    a conveyor belt, said conveyor belt having a working width, the items resting on said conveyor belt within the working width, said conveyor belt being designed and arranged to transport the items in a conveying direction perpendicular to the working width; and
    a shaft, said shaft being designed and arranged to be driven to rotate in a way to contact and remove the mass from the rear bottom portion of the items, said shaft being designed as a hollow shaft, said shaft being designed and arranged to extend over the working width and to be supported from inside and within the working width.

2. The apparatus of claim 1, wherein said apparatus is designed as a coating machine, said hollow shaft being located at a downstream end of said conveyor belt as seen in the conveying direction.

3. The apparatus of claim 1, further comprising:
    a second conveyor belt, said second conveyor belt having a working width, the items resting on said second conveyor belt within the working width, said second conveyor belt being designed and arranged to transport the items in a conveying direction perpendicular to the working width, said second conveyor belt being located adjacent to said fist conveyor belt and downstream of said first conveyor belt as seen in the conveying direction.

4. The apparatus of claim 3, wherein said hollow shaft arranged in a gap portion located between said first and said second conveyor belt.

5. The apparatus of claim 1, wherein
    said hollow shaft has a free cross-section; and said apparatus further comprises a supporting element being designed and arranged to at least extend over the working width and through the free cross-section of said hollow shaft.

6. The apparatus of claim 4, wherein
said hollow shaft has a free cross-section; and
said apparatus further comprises a supporting element being designed and arranged to at least extend over the working width and through the free cross-section of said hollow shaft.

7. The apparatus of claim 5, wherein
said supporting element is designed to be stationary; and
said supporting element is designed and arranged such that there is a clearance between said supporting element and said hollow shaft, the clearance allowing for the rotational movement of said hollow shaft.

8. The apparatus of claim 6, wherein
said supporting element is designed to be stationary; and
said supporting element is designed and arranged such that there is a clearance between said supporting element and said hollow shaft, the clearance allowing for the rotational movement of said hollow shaft.

9. The apparatus of claim 5, wherein said supporting element is designed and arranged to be subjected to tensile stress.

10. The apparatus of claim 6, wherein said supporting element is designed and arranged to be subjected to tensile stress.

11. The apparatus of claim 5, wherein said supporting element is designed as an element selected from the group consisting of a bearing rod, a wire and a wire cable being made of at least one material selected from the group consisting of metal and plastic.

12. The apparatus of claim 6, wherein said supporting element is designed as an element selected from the group consisting of a bearing rod, a wire and a wire cable being made of at least one material selected from the group consisting of metal and plastic.

13. The apparatus of claim 1, further comprising
a stripper sheet metal,
    said stripper sheet metal being located below said hollow shaft
    said stripper sheet metal being designed and arranged to be approximately vertical,
    said stripper sheet metal being designed and arranged to be heated, and
    said stripper sheet metal being designed and arranged to additionally support said hollow shaft and to remove the mass from said hollow shaft.

14. The apparatus of claim 4, further comprising
a stripper sheet metal,
    said stripper sheet metal being located below said hollow shaft,
    said stripper sheet metal being designed and arranged to be approximately vertical,
    said stripper sheet metal being designed and arranged to be heated, and
    said stripper sheet metal being designed and arranged to additionally support said hollow shaft and to remove the mass from said hollow shaft.

15. The apparatus of claim 5, further comprising
a stripper sheet metal,
    said stripper sheet metal being located below said hollow shaft,
    said stripper sheet metal being designed and arranged to be approximately vertical,
    said stripper sheet metal being designed and arranged to be heated, and
    said stripper sheet metal being designed and arranged to additionally support said hollow shaft and to remove the mass from said hollow shaft.

16. The apparatus of claim 6, further comprising
a stripper sheet metal,
    said stripper sheet metal being located below said hollow shaft
    said stripper sheet metal being designed and arranged to be approximately vertical,
    said stripper sheet metal being designed and arranged to be heated, and
    said stripper sheet metal being designed and arranged to additionally support said hollow shaft and to remove the mass from said hollow shaft.

17. The apparatus of claim 5, wherein said hollow shaft and said supporting element are designed and arranged to be height adjustable.

18. The apparatus of claim 6, wherein said hollow shaft and said supporting element are designed and arranged to be height adjustable.

19. The apparatus of claim 5, wherein said supporting element is designed to be resilient.

20. The apparatus of claim 6, wherein said supporting element is designed to be resilient.

21. The apparatus of claim 9, further comprising a spring being designed and arranged to apply the tensile stress to said supporting element.

22. The apparatus of claim 10, further comprising a spring being designed and arranged to apply the tensile stress to said supporting element.

23. The apparatus of claim 1, further comprising a plurality of guiding elements being designed and arranged to support said hollow shaft from the inside of said hollow shaft.

24. The apparatus of claim 4, further comprising a plurality of guiding elements being designed and arranged to support said hollow shaft from the inside of said hollow shaft.

25. The apparatus of claim 1, wherein the items are confectionaries.

26. The apparatus of claim 25, wherein the mass is a coating mass.

27. The apparatus of claim 26, wherein the coating mass is chocolate.

28. The apparatus of claim 4, wherein said first conveyor belt is part of a coating machine and said second conveyor belt is part of a cooling tunnel.

* * * * *